United States Patent [19]

Egawa et al.

[11] Patent Number: 5,717,854
[45] Date of Patent: Feb. 10, 1998

[54] MULTIMEDIA SERVER HAVING A PLURALITY OF STREAM CONTROLLERS DIRECTLY CONNECTED TO THE NETWORK

[75] Inventors: Hiroichi Egawa; Kiichi Matsuda; Yasushi Inamoto; Takashi Hamano; Naoshi Matsuo, all of Kanagawa, Japan

[73] Assignee: Fujitsu Limited, Kanagawa, Japan

[21] Appl. No.: 563,544

[22] Filed: Nov. 28, 1995

[30] Foreign Application Priority Data

Nov. 28, 1994 [JP] Japan ................... 6-292924

[51] Int. Cl.$^6$ ........................................ G06F 15/16
[52] U.S. Cl. .................. 395/200.2; 348/7; 395/200.13; 395/200.19; 395/841; 395/853
[58] Field of Search ................ 348/7; 395/200.04, 395/200.05, 200.13, 200.19, 841, 853, 200.2

[56] References Cited

U.S. PATENT DOCUMENTS

| | | | |
|---|---|---|---|
| 4,855,903 | 8/1989 | Carleton et al. | 395/200.05 |
| 5,333,320 | 7/1994 | Seki | 395/650 |
| 5,414,455 | 5/1995 | Hooper et al. | 348/7 |
| 5,508,732 | 4/1996 | Bottomley et al. | 348/7 |
| 5,550,577 | 8/1996 | Verbiest et al. | 348/7 |
| 5,566,321 | 10/1996 | Pase et al. | 395/480 |

Primary Examiner—Kenneth S. Kim
Attorney, Agent, or Firm—Helfgott & Karas, P.C.

[57] ABSTRACT

Each of processor units 31-1–31-n comprises a CPU, memory, and interface function. A high-speed communications network 32 interconnects the processor units for interprocessor communications. Each of input/output units 33-1–33-n stores multimedia data and transmits the multimedia data through the network under the control of the corresponding processor unit. A processor control unit 34 controls the process of each of the processor units 31-1–31-n according to the process request received through the network. A switch 35 connects each of the input/output units 33-1–33-n to the network and exchanges data through the network. A communications line 36 transfers an instruction, etc. from the processor control unit 34 to each of the processor units 31-1–31-n.

14 Claims, 15 Drawing Sheets

| TITLE | STREAM CONTROLLER NUMBER | TRANSFER RATE | ADDITIONAL INFORMATION |
|---|---|---|---|
| PICTURE 1 | 1 | 6 Mbit/sec | |
| DRAMA 1 | 2 | 6 Mbit/sec | |
| SPORTS 1 | 2 | 6 Mbit/sec | |
| PICTURE 2 | 3 | 6 Mbit/sec | |

FIG. 9A

| STREAM CONTROLLER NUMBER | CURRENT SERVICE | CURRENTLY-USED BAND | AMOUNT OF STORED DATA |
|---|---|---|---|
| 1 | 5 | 20 Mbit/sec | 20 GB |
| 2 | 8 | 40 Mbit/sec | 20 GB |
| 3 | 10 | 50 Mbit/sec | 30 GB |

FIG. 9B

|  | | TIGHTLY-COUPLED ARCHITECTURE | LOOSELY-COUPLED ARCHITECTURE |
|---|---|---|---|
| FUNCTIONS | LATENCY OF INTER-PROCESSOR COMMUNICATIONS | SMALL (SOME $\mu$s-TENS OF $\mu$s) | LARGE (SOME ms) |
| | THROUGHPUT OF INTER-PROCEESSOR COMMUNICATIONS | LARGE (TENS OF MB/s) | SMALL (SOME MB/s) |
| | COMMUNICATIONS UNIT | NOT DEFIND | 1.5KByte (IEEE802.3) |
| INFLUENCES ON SERVICES | SYNCHRONIZATION OF DISTRIBUTED MULTIMEDIA DATA (SYNCHRONIZATION OF MULTIPLE SCREENS) | EASILY PERFORMED | DIFFICULT IF TRAFFIC IS HEAVY |
| | RETRIEVAL OF DISTRIBUTED MULTIMEDIA DATA (DAISY-CHAIN-FORM RETRIEVAL IN DATABASE) | HIGH-SPEED PARALLEL RETRIEVAL | SEQUENTIAL RETRIEVAL |
| | SYNCHRONOUS SERVICE FOR MULTIPLE USERS (USER-PLAYING GAME) | EASILY PERFORMED | DIFFICULT IF TRAFFIC IS HEAVY |

F I G. 1 2

| NUMBER OF PROCESSORS | P | m [Byte] | NUMBER OF PLAYERS PER PROCESSOR | NUMBER OF SIMULTANEOUSLY-PARTICIPATING PLAYERS |
|---|---|---|---|---|
| 4 | 2 | 142,301 | 1423 | 5692 |
| 16 | 4 | 35,426 | 354 | 5664 |
| 64 | 8 | 4,254 | 42 | 2688 |
| 256 | 16 | 358 | 3 | 768 |

FIG. 14

| NUMBER OF PERSONAL COMPUTERS | ALL-TO-ALL COMMUNICATIONS TIME | DATA TRANSMIOSSION TIME | NUMBER OF SIMULTANEOUSLY-PARTICIPATING PLAYERS |
|---|---|---|---|
| 2 UNITS | 2 TIMES | 14 TIMES | 392 USERS |
| 3 UNITS | 6 TIMES | 4 TIMES | 168 USERS |
| 4 UNITS | 12 TIMES | 2 TIMES | 112 USERS |
| 5 UNITS | 20 TIMES | 1 TIME | 70 USERS |
| 6 UNITS | 30 TIMES | 0 TIME | 0 USER |

F I G. 15

MULTIMEDIA SERVER HAVING A PLURALITY OF STREAM CONTROLLERS DIRECTLY CONNECTED TO THE NETWORK

BACKGROUND OF THE INVENTION

1. Field of the Invention

The present invention relates to a server for storing and distributing various information, and more specifically to a multimedia server capable of transmitting a large volume of multimedia information at a high speed.

2. Description of the Related Art

Recently, multimedia technology of collectively processing the information of voice data, image data, text data. etc. has become popular. Especially, the technology has been actively developed to transmit a large volume of data at a high speed. For example, advanced research and development have ensure the popularity of the broadband communications, image compressing techniques, etc., and various services have been provided by effectively and optionally combining these technologies.

The above listed services require a data server capable of efficiently storing an enormous amount of multimedia data and quickly providing necessary information in response to customers' requests. Described below is the configuration of the conventional multimedia server developed to function as server for providing, for example, image information.

FIG. 1 shows the configuration of the server according to the first prior art. The server is based on a massively parallel processor. In FIG. 1, a storage device 1 comprises a plurality of hard disks. A processing device 2 comprises a plurality of processing modules 3. Each of the processing modules 3 comprises a CPU 4 and a memory 5. A personal computer 6 processes communicating the data read from the storage device 1. A multiplexing device/switching unit 7 multiplexes and switches data.

With the server, the processing device 2 reads video data from the storage device 1 (a plurality of hard disks) in parallel. The processing device 2 comprises a number of processing modules 3 connected in a mesh form and, for example, inquires synchronization. After transforming in the personal computer 6 the communications format of the data processed by the processing device 2, the personal computer 6 transmits the data to the network through the multiplexing device/switching unit 7.

Thus, the request signal received through the network and the video data output to the network are processed by the processing device 2. The server with the above described configuration has a plurality of data stream paths in the processing device 2 and transmits data in a parallel process.

FIG. 2 shows the configuration of the server according to the second prior art. The server is based on a general-purpose processor. A disk array 11 is a storage device comprising a plurality of hard disks. A processing device 12 comprises a CPU 14 and a main memory 15. The CPU 14 and main memory 15 are connected to a high-speed bus 13. A data server 16 converts the data read from the disk array 11 into a communications format and outputs it to a LAN 17. The LAN 17 is, for example, a token ring. A multiplexing device/switching unit 18 outputs the data transferred through the LAN 17 to the network.

When data is distributed at a request to distribute the data received through the network with the above described configuration, the request to distribute the data is first provided for the CPU 14 through the LAN 17 and data server 16. According to the request, the CPU 14 reads the data in parallel from a plurality of hard disks in the disk array 11, and temporarily stores it in the main memory 15 through the high-speed bus 13. Then, the data server 16 converts the data into the communications format and outputs the data after adding a destination address to the data.

FIG. 3 shows the configuration of the server according to the third prior art. The server is based on an exclusive unit. A processing device 21 comprises a stream conditioner 23 and a stream controller 24, both connected to a high-speed bus 22. The stream conditioner 23 comprises a memory to convert and distribute data. The stream controller 24 comprises a processor, etc. and controls the stream conditioner 23. An ATM multiplexing device 25 passes cell-formatted data transformed by the stream conditioner 23 to the multiplexing device/switching unit 18. A control system 26 processes a request transferred through the network.

When data is distributed at a request to distribute the data received through the network with the above described configuration, the request to distribute the data is provided for the control system 26. In response to the request, the control system 26 requests the disk array 11 and stream controller 24 to distribute the data. The stream controller 24 reads data in parallel from a plurality of hard disks in the disk array 11, and temporarily stores the data in the stream conditioner 23 through the high-speed bus 22. The stream conditioner 23 distributes the data after converting its format (into the ATM cell format in this example). Then, the cells are output to the network through the ATM multiplexing device 25 and multiplexing device/switching unit 18.

With the configuration shown in FIG. 3, unlike the configuration shown in FIG. 1 or 2, the path of signals transferred through the network is separate from the path in which the data read from the storage device is transferred.

The three configurations described above are explained in detail in the documents "NIKKEI COMMUNICATIONS 1994, 4, 4 VOL. 1717.

The above described three configurations have the following problems. That is, the configuration shown in FIG. 1 has a bottleneck of a number of processing modules. The configuration shown in FIG. 2 or 3 has a bottleneck about the bus.

In the configuration shown in FIG. 1, a number of processing modules 3 are provided between the storage device for storing multimedia data and the transmission line interface (the personal computer 6 in this example). Each of the processing modules 3 performs a predetermined process (copying data when necessary, delaying data to synchronize read data, etc.) on data after temporarily storing the data in its memory. If a number of processing modules individually perform the above described processes, they require a long processing time, thereby lowering the performance in a real-time process.

With the configuration shown in FIG. 2 or 3, the disk array 11 is connected to a processor unit (the CPU 14 in FIG. 2 and stream controller 24 in FIG. 3) for controlling various units and processes through a bus. All data read from a plurality of hard disks in the disk array 11 are transferred through a single bus. Thus, the limit in transmission speed through the bus is a bottleneck of this configuration, thereby interfering with a high-speed data transfer.

With the configuration shown in FIG. 1 or 2, a request signal received through the network and the data read from the storage device are transmitted through the same path. In this case, the contention between the request signal and data also interferes with a high-speed data transfer.

SUMMARY OF THE INVENTION

The present invention aims at providing a multimedia server to realize high-speed data transfer from the storage device storing various data to the network.

The multimedia server according to the present invention processes data at a process request received through the network. The multimedia server includes a plurality of data storing units, a plurality of processing units, a control unit, and an inter-processing-unit network. A plurality of data storing units are connected to the above described network and store data. The plurality of processing units are provided one to one for the plurality of data storing units to control the transmission of data between each data storing unit and the network. The control unit receives the process request from the network and controls the plurality of processing units. The inter-processing-unit network is, for example, a torus network and connects the plurality of processing units.

Since the multimedia server has the storing unit connected to the network with the above described configuration, the data can be transmitted at a high speed when the data read from the storing unit is sent through the network or when the data is received through the network is stored in the storing unit. Since the associated operations among a plurality of processing units can be performed at a high speed by providing the inter-processing-unit network, a synchronizing process on the data read from a plurality of storing units can also be efficiently performed.

BRIEF DESCRIPTION OF THE DRAWINGS

FIG. 9A is a table in the control server, and contains information required for each piece of the data stored in the multimedia server;

FIG. 9B is a table in the control server, and contains information required for each stream controller;

FIG. 12 shows the state of the inter-processor communications unit and the influence of the unit on various services;

FIG. 14 shows a table indicating the number of persons who can simultaneously join a game in a tightly-coupled architecture; and FIG. 15 shows a table indicating the number of persons who can simultaneously join a game in a loosely-coupled architecture.

DETAILED DESCRIPTION OF THE INVENTION

The embodiments of the present invention are described below by referring to the attached drawings.

Figure 1:
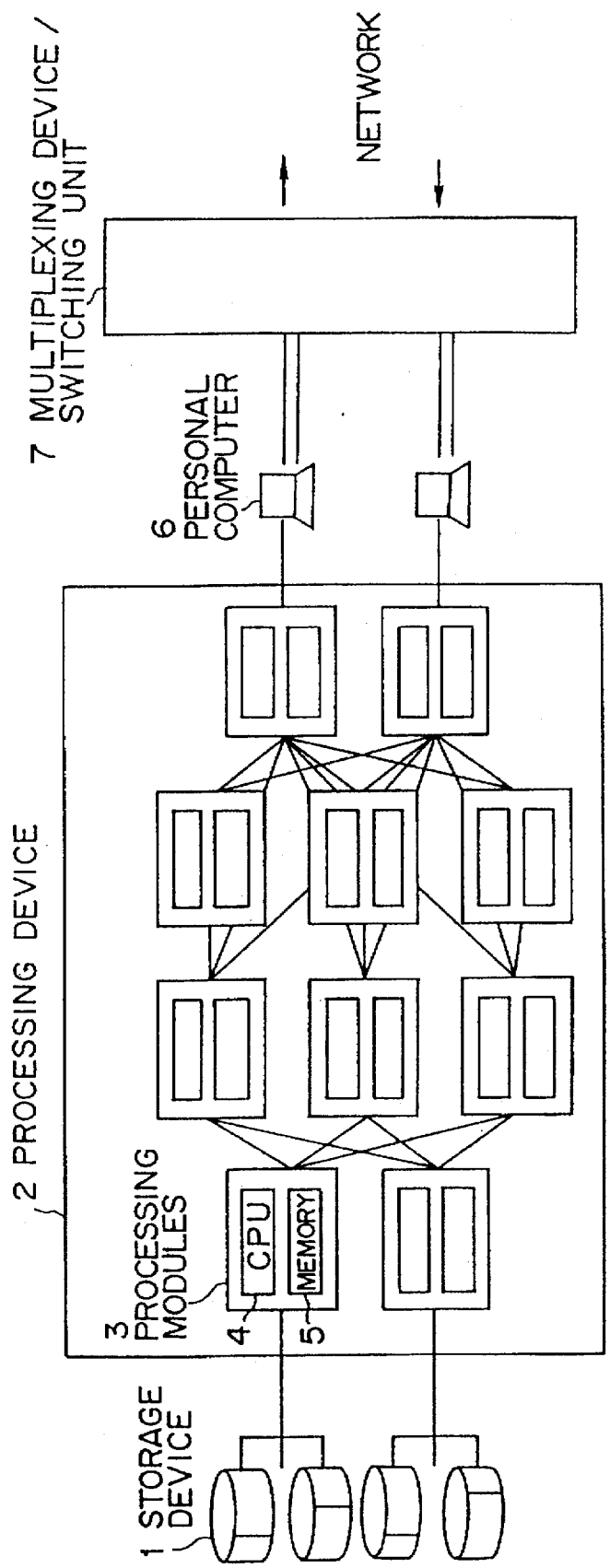
FIG. 1 shows the configuration of the server according to the first prior art.
Figure 2:
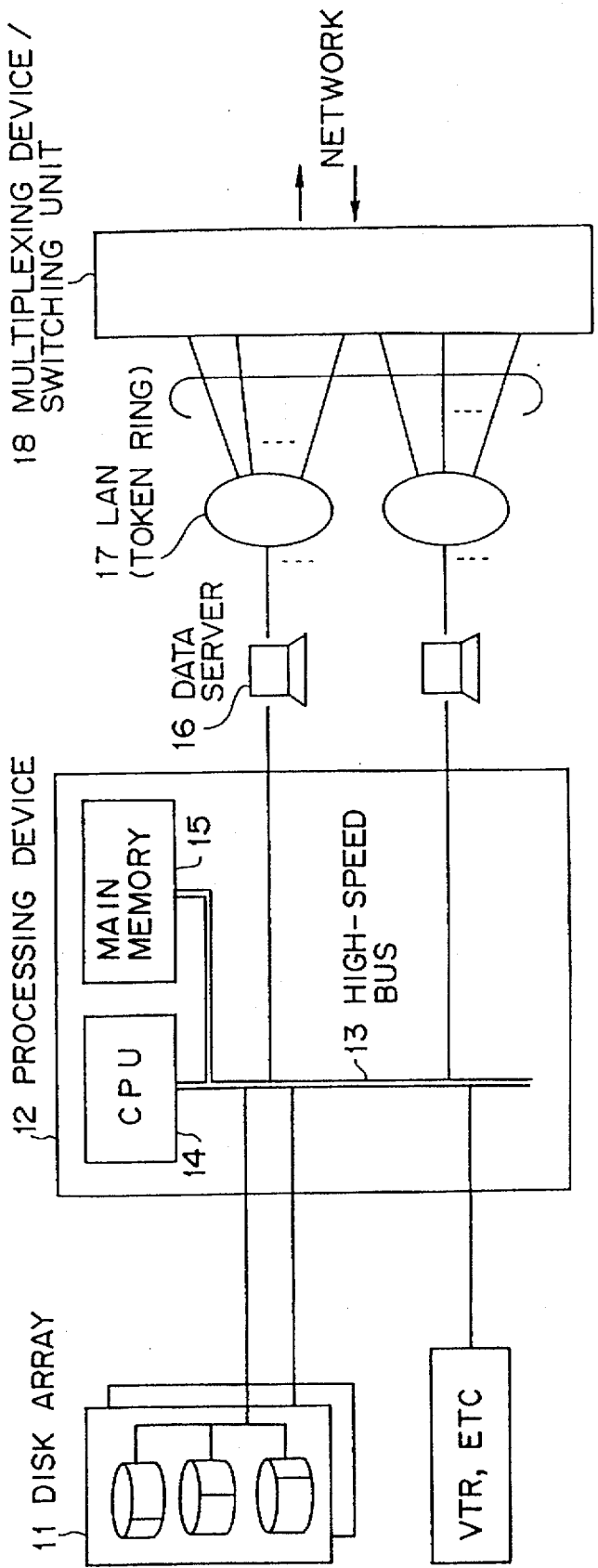
FIG. 2 shows the configuration of the server according to the second prior art.
Figure 3:
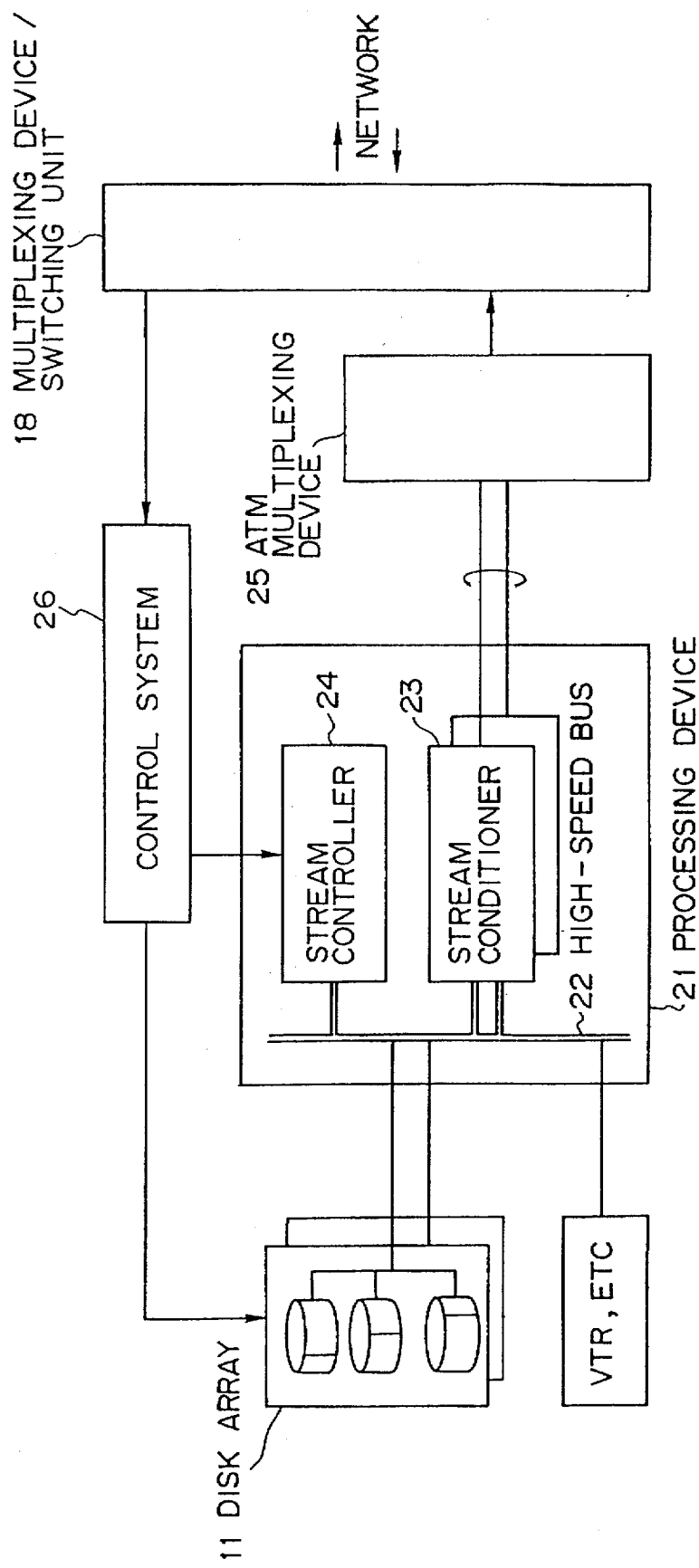
FIG. 3 shows the configuration of the server according to the third prior art.
Figure 4:
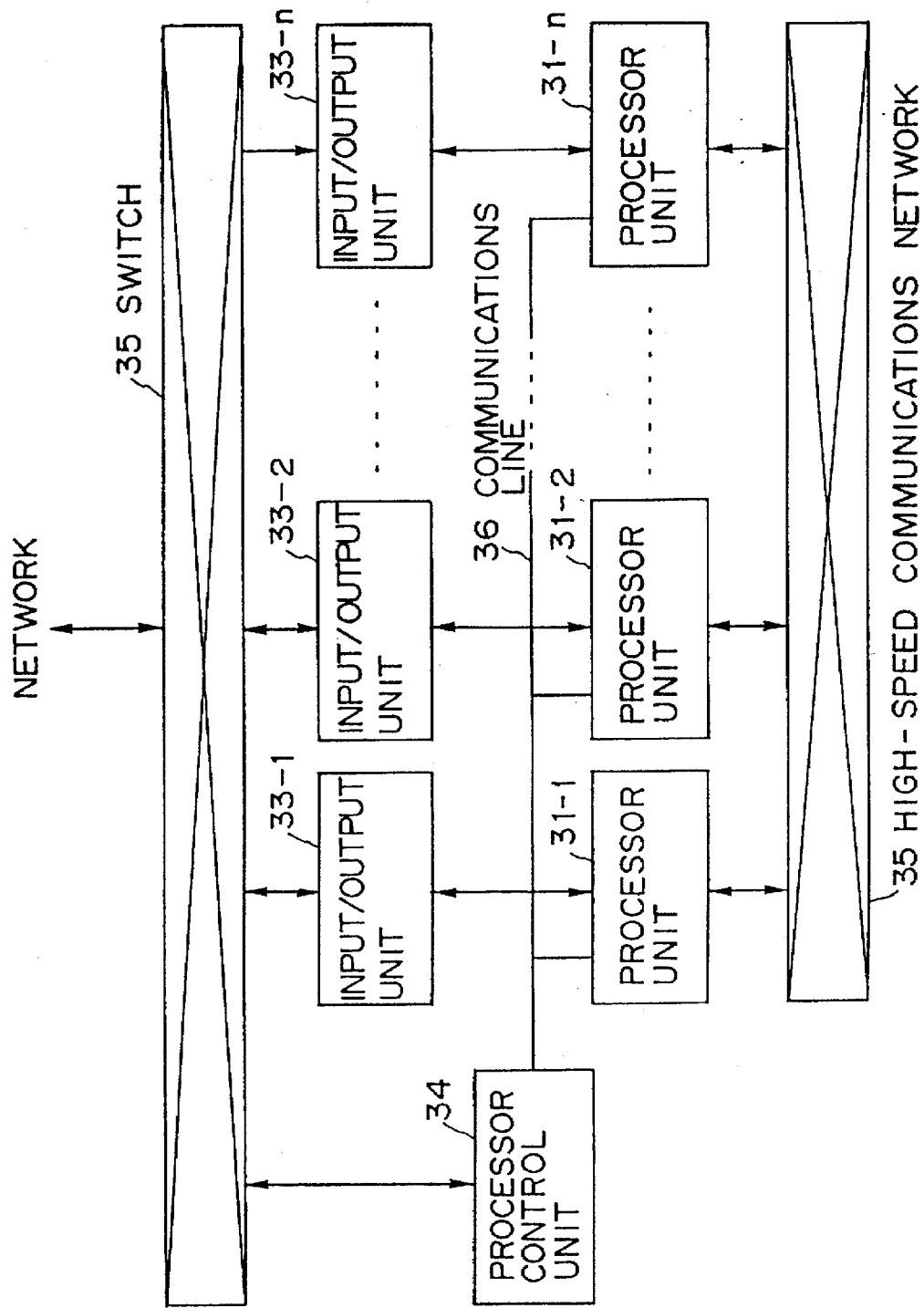
FIG. 4 shows the principle of the present invention.

FIG. 4 shows the principle of the present invention. Processor units 31-1–31-n function as CPUs, memories, and interfaces. A high-speed communications network 32 interconnects the processors to establish inter-processor communications. Input/output units 33-1–33-n store multimedia data and transmit the multimedia data through the network under the control of corresponding processors. A processor control unit 34 controls the processes of the processor units 31-1–31-n according to a process request received through the network. By executing the program stored in the processor control unit 34, the processor control unit 34 can transfer to the processor units 31-1–31-n a request to output the multimedia data stored in the input/output units 33-1–33-n through the network. A switch 35 connects each of the input/output units 33-1–33-n to the network and exchange data between them. A communications line 36 transfers an instruction, etc. from the processor control unit 34 to each of the processor units 31-1–33-n.

If a request to access the multimedia data stored in the multimedia server is issued with the above described configuration, the request is received by the processor control unit 34. The processor control unit 34 analyzes the request and determined what instruction should be issued to which processor units 31-1–31-n. For example, if a user connected to the network issues a request to download image data and the specified image data is stored in input/output units 33-1 and 33-2, the processor control unit 34 transfers an instruction to processor units 31- and 31-2 through the communications line 36 to read the specified image data and output it through the network. The input/output units 33-1 and 33-2 read the image data under the control of the processor units 31-1 and 31-2 and output it to the network through the switch 35.

Thus, since the input/output units storing the multimedia data are connected to the network without buses or processing devices, a large volume of data can be transmitted through the network. The communications line 36 is not a path through which multimedia data is transmitted, but a path through which a request signal received through the network is transferred to each processor unit. Therefore, there is no contention occurring between control data as a result of a user request and multimedia data, thereby efficiently performing a process at a high speed in response to an access request.

If the multimedia data stored in an input/output unit is transferred to another input/output unit, it is transferred through the switch 35, thereby reducing the amount of the process to be performed by the processor units.

When the processor units 31-1–31-n should perform a process in synchronism with one another, a synchronization signal is transmitted through the high-speed communications network 32. Thus, various services such as reading plural pieces of data stored in a plurality of input/output units in parallel and simultaneously displaying them (for example, opening a plurality of windows to display different sequential video image data on each window) can be provided for many users.

If plural pieces of related information are stored in different input/output units when the multimedia data stored in the input/output units 31-1–31-n are searched, then a retrieval request notification and a retrieval result notification are transmitted between the processor units by interprocessor unit communications. For example, if the retrieval result of the processor unit 31-1 is related to the data stored in the input/output unit 33-2, then a retrieval request is transferred from the processor unit 31-1 to the input/output unit 33-2 through the high-speed communications network 32. Here, multimedia data, such as image data, is not transferred via the high-speed communication network 32. Thus, requests can be quickly processed even if a large number of users simultaneously issue retrieval requests.

When the configuration of a multimedia server system is modified, units can be added or deleted in a set of an input/output unit and a processor unit. Thus, the system can be easily modified to realize a multimedia server on an appropriate scale.

Figure 5:
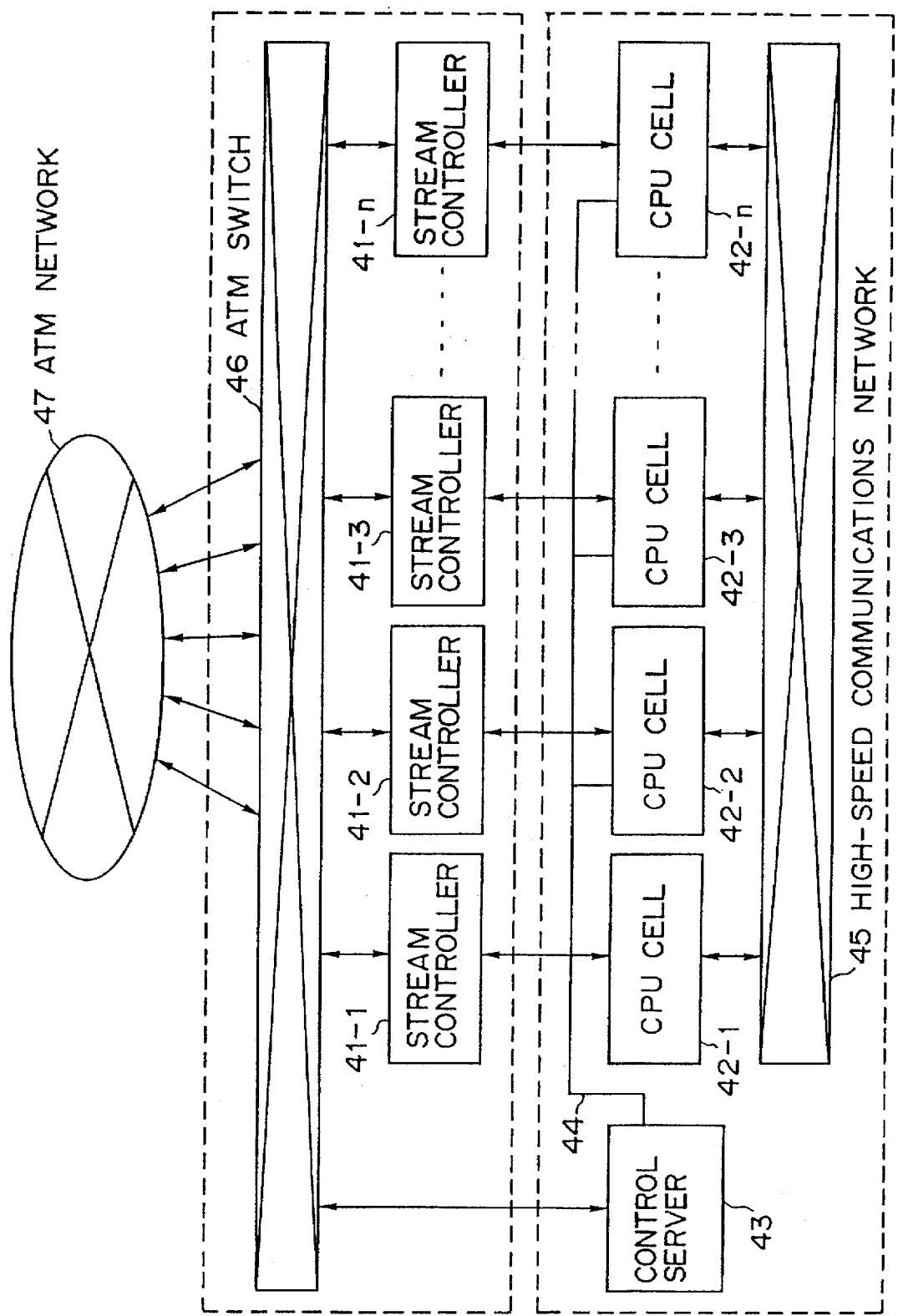
FIG. 5 shows the configuration of the multimedia server embodying the present invention.

FIG. 5 shows the configuration of an embodiment of the multimedia server according to the present invention. The multimedia server can provide such services as data distribution, database retrieval, etc. according to a process request from the user through the network. Furthermore, the multimedia server can distribute data without receiving a process request from a user.

Stream controllers 41-1–41-n store multimedia data. Under the control of the CPU cells 42-1–42-n, the multimedia data can be transmitted between the stream controllers 41-1–41-n and an ATM network 47. That is, the stream controllers 41-1–41-n reads the stored multimedia data, outputs it through the ATM network 47, and receives and stores the multimedia data transferred from the ATM network 47 under the control of the CPU cells 42-1–42-n.

The CPU cells 42-1–42-n are correspondingly provided for the stream controllers 41-1–41-n. The CPU cells 42-1–42-n control corresponding stream controllers 41-1–41-n according to an instruction from a control server 43. The CPU cells 42-1–42-n and control server 43 are connected to a bus 44, and an instruction signal from the control server 43 to the CPU cells 42-1–42-n is transferred through the bus 44.

The high-speed communications network 45 is, for example, a torus network and interconnects the CPU cells 42-1–42-n. That is, when the CPU cells 42-1–42-n communicate with each other, information is transmitted through the high-speed communications network 45. An ATM switch 46 is connected to the ATM network 47 and accommodates the stream controllers 41-1–41-n and control server 43. Then, the ATM switch 46 autonomously routes the cells according to the routing information set in each cell.

The stream controllers 41-1–41-n, CPU cells 42-1–42-n, control server 43, bus 44, and ATM switch 46 shown in FIG. 5 respectively correspond to the input/output units 31-1–31-n, the processor units 31-1–31-n, processor control unit 34, communications line 36, and switch 35 shown in FIG. 4.

FIG. 6A is a block diagram showing the stream controller. Disk devices 51-1–51-m are storage devices storing multimedia data. A disk controller 52 controls the operations of the disk devices 51-1–51-4 m. An ATM interface device 53 disassembles/assembles an ATM cell and interfaces with the ATM switch 46. The stream controllers 41-1–41-n are controlled by corresponding CPU cells 42-1–42-n.

FIG. 6B is a block diagram showing a CPU cell. A CPU 54 controls a corresponding stream controller. A memory 55 is a work area used by the CPU 54. A communications interface device 56 interfaces with the high-speed communications network 45 and is used in the communications between the CPU cells. A bus interface device 57 interfaces with the bus 44 connected to the control server 43.

FIG. 6C is a block diagram showing the control server 43. An ATM interface device 58 interfaces with the ATM switch 46 and receives a process request transferred from the ATM network 47. The CPU 59 controls the CPU cells 42-1–42-n. A memory 60 is a work area to be used by a CPU 59. A controller disk 61 stores the information for use in managing the stream controllers 41-1–41-n and CPU cells 42-1–42-n. A CPU cell interface device 62 interfaces with the bus 44 to which the CPU cells 42-1–42-n are connected.

Figure 7:
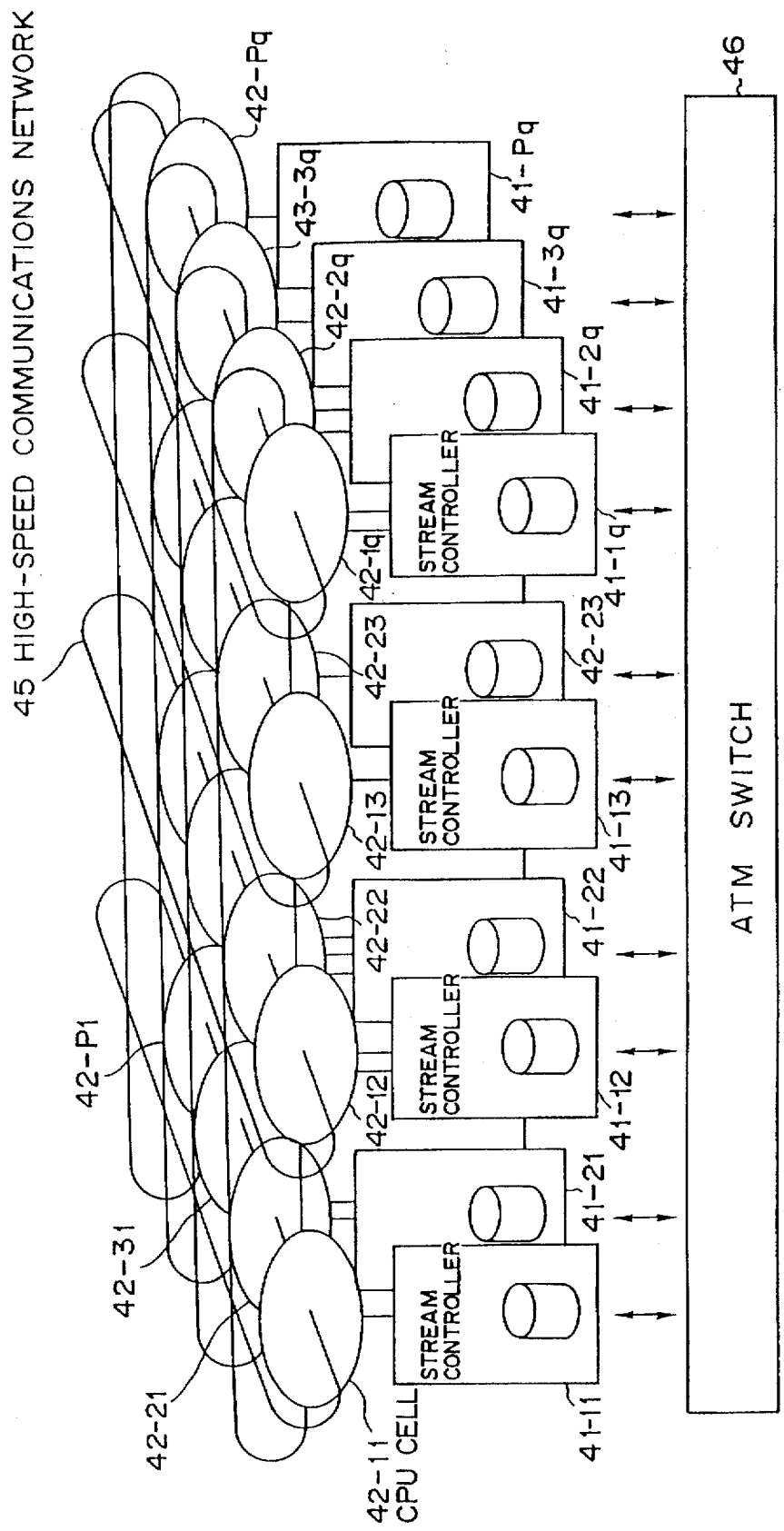
FIG. 7 shows the connection and configuration of the CPU cells and the stream controller.

FIG. 7 shows the connection of CPU cells and stream controllers. In FIG. 7, individually p×q stream controllers and CPU cells are provided. The high-speed communications network 45 is a torus network and is a two-dimensional torus network in this example. That is, the CPU cells 42-11, 42-12, . . . , 42-q, . . . , 42-pq are interconnected through a two-dimensional torus network. Each of the stream controllers is connected to the ATM switch 46.

With the configuration shown in FIG. 7, each CPU cell can communicate with any CPU cell through the high-speed communications network 45. Since the worst possible value in the inter-CPU communications can be easily estimated in the torus network, the system can be easily designed using the multimedia server. Furthermore, the high-speed communications network 45 can simultaneously establish a plurality of communications. For example, the communications between the CPUs 42-11 and 42-12 can be established concurrently with the communications between the CPU cell 42-13 and 42-31.

Figure 6:
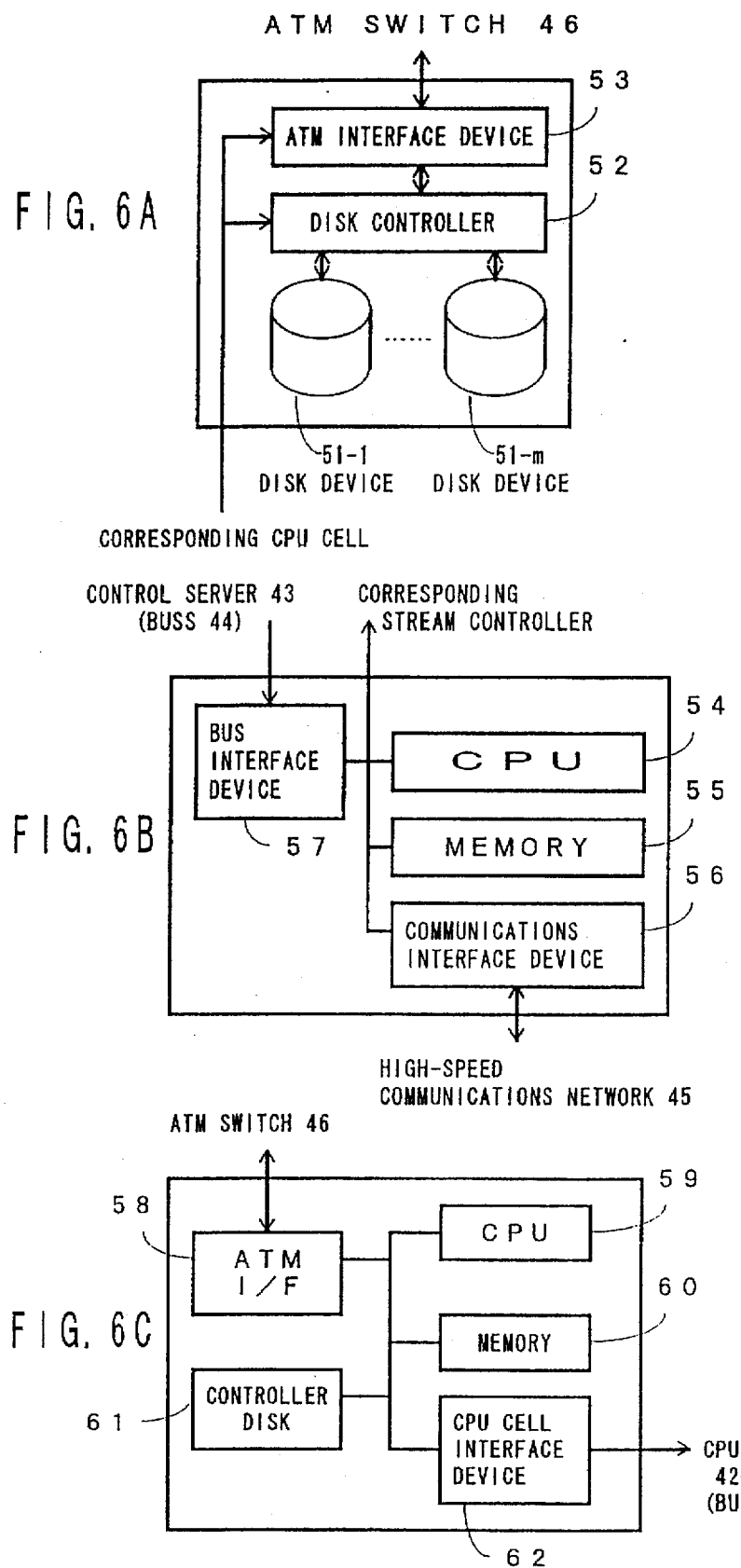
FIG. 6A is a block diagram showing a stream controller.
FIG. 6B is a block diagram showing a CPU.
FIG. 6C is a block diagram showing a control server 43.

The outline of the operations of the multimedia server is explained by referring to FIGS. 5 and 6. When an instruction to output multimedia data is issued from the control server 43 to the CPU cell 42-1, the CPU cell 42-1 issues to a stream controller 41-1 an instruction to read multimedia data from the disk devices 51-1–51-m of the stream controller 41-1 and output the read multimedia data to the ATM switch 46. When an input instruction is received, the CPU cell 42-1 issues to the stream controller 41-1 an instruction to receive the multimedia data from the ATM switch 46 and write the received multimedia data to the disk devices 51-1–51-m.

The CPU cells are interconnected to each other through the high-speed communications network 45. If communications are required between the CPU cells, the CPU cells are allowed to cooperate with each other (for example, synchronous operations) by transmitting data through the high-speed communications network 45.

For example, when plural types of multimedia data transmitted by the multimedia server is simultaneously displayed on the same display, the plural types of multimedia data should be transferred in synchronism with each other. A synchronization signal is transmitted through the high-speed communications network 45 provided for the inter-CPU communications.

Since the high-speed communications network 45 is a network provided independently of the route through which a large volume of multimedia data such as sequential video image data, etc. are transmitted, a synchronizing process has no influence on the transfer of multimedia data such as sequential video image data. Likewise, the transfer of multimedia data such as sequential video image data has no influence on the synchronizing process. Therefore, even if there is a large volume of multimedia data to be transferred, services can be provided for many users with necessary synchronizing processes.

Under the control of the CPU cell for managing the stream controller, each stream controller sends the multimedia data stored in the disk devices 51-1–51-m to the ATM network 47, receives the multimedia data from the ATM network 47, and stores them in the disk devices 51-1–51-m.

The ATM switch 46 is provided to efficiently utilize the communications paths in the communications through the ATM network 47. When the multimedia data stored in the disk devices 51-1–51-m is copied (or moved) to another stream controller, each stream controller transfers the multimedia data through the ATM switch 46, thereby reducing the load on the CPU cells.

When multimedia data is retrieved after being periodically updated in response to the request from the user, plural pieces of related information may be separately stored in a plurality of stream controllers. In this case, information related to a retrieval result is retrieved one after the other in a daisy chain form. For example, if a retrieval result of the CPU cell 42-1 is related to the information stored in the stream controller 41-2 controlled by the CPU cell 42-2, then the CPU cell 42-1 transfers the retrieval result and retrieval request to the CPU cell 42-2 through the high-speed communications network 45. According to the retrieval result and retrieval request received from the CPU cell 42-1, the CPU cell 42-2 retrieves the information stored in the stream controller.

Since a signal for use in requesting to retrieve data between the CPU cells is transmitted through the high-speed communications network 45, the retrieval result can be obtained within a short time with an increasing number of users.

When multimedia data generated by a user is simultaneously (on real time) transmitted to a plurality of users connected to the multimedia server, synchronization is required in the data transfer to the plurality of users. Since a synchronization signal is transmitted through the high-speed communications network 45, the number of simultaneously-connectable users can be greatly increased.

Described below is the operations of the multimedia server with the above described configuration. The user connected to the ATM network 47 issues a request to be provided with sequential video image data.

Figure 8:
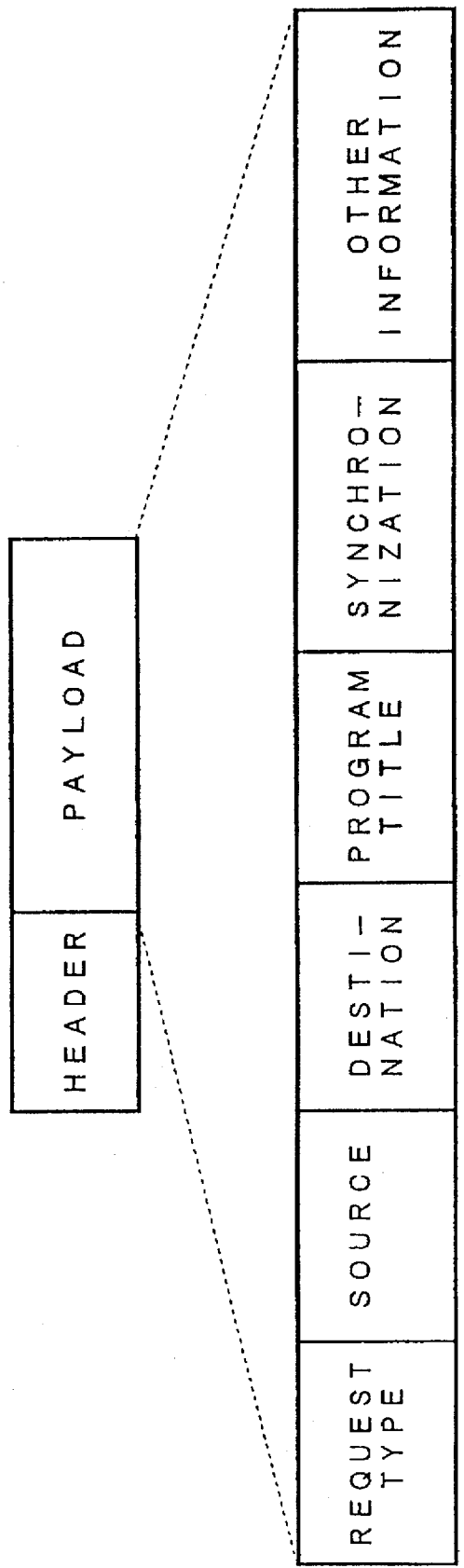
FIG. 8 is an example of the process request information transferred from the user to the multimedia server.

FIG. 8 shows an example of process request information transferred from the user to the multimedia server. The process request information is transferred after being stored in a payload of an ATM cell.

Request type information indicates the service type requested by the user. For example, it specifies image data distribution, data retrieval, inter- personal-computer communications, etc. Source information identifies the user who has issued a process request. Destination information refers to the destination of data. It is specified when, for example, the data stored in a multimedia server is distributed, when the retrieval result is provided, or when inter-personal-computer communications are established.

A program title identifies a program user requests to distribute (a program user requests to check). Synchronization information is specified, for example, when plural pieces of multimedia data are simultaneously displayed.

When an ATM cell storing the above described process request is transferred to a multimedia server through the ATM network 47, the ATM cell is received by the control server 43.

FIG. 9 shows the table stored in the control server 43. FIG. 9A shows a table containing the information required for each piece of data stored in the multimedia server, and shows as an example a sequential video image data program.

That is, the table shows each program as being stored in which stream controller, and also shows the transfer rate at which each program is transferred to the user.

FIG. 9B shows a table containing the information required for each stream controller, and shows each stream controller with the number of services currently provided by the controller. It also shows the band currently used by each stream controller for the communications line between each stream controller and the ATM switch 46. The amount of data stored in the disk device of each stream controller is also set on the table.

If the process request from the user requests to distribute picture 1, then the CPU 59 in the control server 43 refers to the table shown in FIG. 9 and recognizes that picture 1 is stored in the stream controller 41-1. Then, the CPU 59 instructs the CPU cell 42-1 for managing the stream controller 41-1 to transfer picture 1 to the user at the transfer rate of 6 Mbps. The instruction is transferred via the bus 44. At this time, the information about the stream controller 41-1 is updated on the table shown in FIG. 9B.

The CPU cell 42-1 receives the instruction and notifies the disk controller 52 and ATM interface device 53 of the stream controller 41-1 of the instruction.

The disk controller 52 reads picture 1 from the disk devices 51-1–51-m such that the transfer rate to the ATM network 47 can be 6 Mbps, and passes it to the ATM interface device 53. The ATM interface device 53 converts the data read by the disk controller 52 into an ATM cell, sets in the header of each ATM cell the routing information to the user, and outputs it to the ATM switch 46. The ATM switch 46 transfers the ATM cells to the user through the ATM network 47 according to the routing information of each ATM cell.

When the user connected to the ATM network 47 stores the data in the multimedia server, he or she follows the procedure described below.

First, the user transfers a request to store data to a multimedia server, and the control server 43 receives the request. The CPU 59 in the control server 43 refers to the table shown in FIG. 9 and determines which stream controller should store data according to the currently used band and the volume of stored data, etc. for each stream controller. In this example, the stream controller 41-1 is selected.

The control server 43 transfers an instruction to receive data to the CPU cell 42-1 for managing the stream controller 41-1. According to the received instruction, the CPU cell 42-1 instructs the stream controller 41-1 to receive the data from the user and store it. It also sets the ATM switch 46 such that the data transferred from the user can be routed to the stream controller 41-1.

If a specific stream controller is concentrically accessed, services according to the specific stream controller cannot be provided. To avoid this, the control server 43 monitors the use state of stream controllers and performs the following processes.

Assuming that the stream controller 41-3 stores pictures 2, 3, . . . , and 10 and a plurality of users have issued requests to distribute the programs, each of the requests is received by the control server 43. The control server 43 refers to the table shown in FIG. 9 and checks whether or not the stream controller 41-3 can accept the request.

If the control server 43 determines that the stream controller 41-3 cannot provide the requested services, the control server 43 instructs the CPU cell 42-3 for managing the stream controller 41-3 to copy to another stream controller some pieces of the data specified to be distributed (for example, pictures 2 and 3).

The CPU cell 42-3 controls the stream controller 1-3 according to the instruction. The stream controller 41-3 reads pictures 2 and 3 from its own disk devices 51-1–51-m, and transfers them to another stream controller through the ATM switch 46.

Described below is the synchronization between the CPU cells. In this example, the image data simultaneously read from a plurality of stream controllers are displayed on a single display device.

Figure 10:
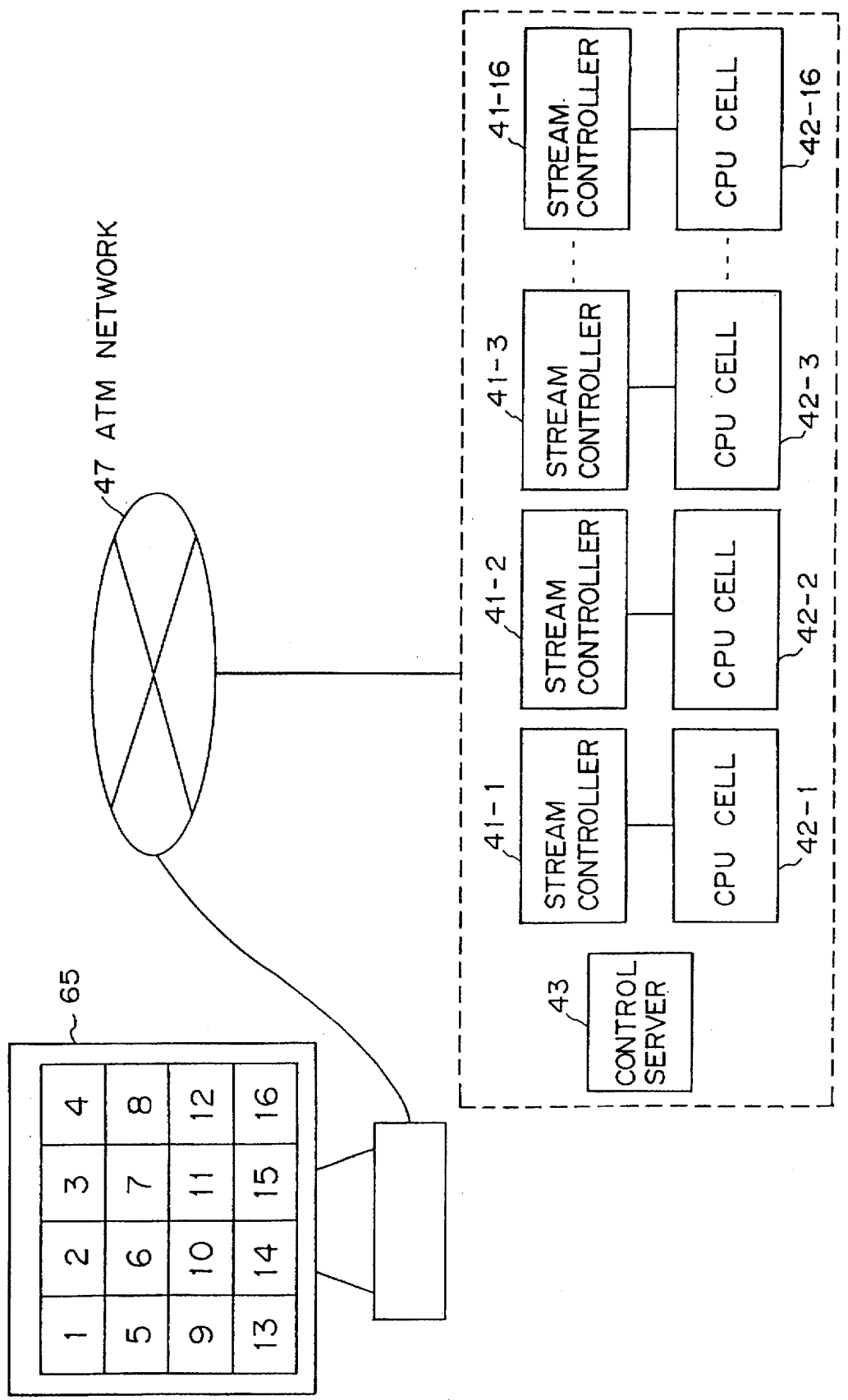
FIG. 10 shows the synchronization between the CPU cells.

FIG. 10 shows the synchronization between the CPU cells. A display 65 opens 16 windows, downloads sequential video image programs 1–16 stored in a multimedia server, and displays them on the respective windows 1–16. That is, program 1 is downloaded from the multimedia server and displayed on window 1. The programs 1–16 are stored in the stream controllers 41-1–41-16 respectively. The sequential video image data displayed on the windows 1–16 are synchronously displayed.

The user of the display 65 notifies the multimedia server of the request through the ATM network 47. The request specifies, for example, an image data distribution service as request type information in the process request information shown in FIG. 8, and specifies the display 65 as the destination information. It also specifies the "programs 1–16" as a program title and the "synchronization required" as synchronization information.

When the control server 43 receives the above described request, it refers to the table shown in FIG. 9, recognizes that the programs 1–16 are respectively stored in the stream controllers 41-1–41-16, and also recognizes that the programs 1–16 should be synchronously transferred. The control server 43 instructs the CPU cells 42-1–42-16 to transfer the programs 1–16 to the display 65. The control server 43 notifies the CPU cell 42-1 that the programs 1–16 should be synchronously transferred.

The CPU cell 42-1 transfers a synchronization signal every 0.5 second to the CPU cells 42-2–42-16 through the high-speed communications network 45. The synchronization signal comprises 8-byte clock time information and 8-byte relative time information. The clock time information indicates the time kept by the internal clock of each CPU cell. The internal clock of each CPU cell matches each other with error smaller than 1 msec. The relative time information refers to the time elapsing from the start of each program.

The CPU cells 42-2–42-16 control data transfer by synchronizing the CPU cell 42-1 according to synchronization signals.

According to the above described example of operations, the sequential video image data is distributed. However, the present invention is not limited to processing sequential video image data, but relates to the process of static images, graphical data, voice data, programs, etc. as long as the data is digitalized. The multimedia data storage device can be a disk device, tape device, semiconductor memory, etc. as long as the device can store digital data.

Although the configuration shows the user communications system using an ATM network, the present invention is not limited to this application, but can be a transmission line of a conventional analog public network or a private network such as a LAN as long as the information transmission unit is operated using electric signals. Furthermore, information can be distributed and received, and data can be simultaneously transmitted in the above described method.

Described below is the architecture for the communications between the processors. In the inter-processor communications (communications between the CPU cells) according to the present invention, information is transmitted through the high-speed communications network 45. The high-speed communications network 45 is, for example, a torus network shown in FIG. 7. That is, the network is formed by connecting a plurality of CPU cells in a mesh form. This configuration is referred to as a tightly-coupled architecture. In the following description, the tightly-coupled architecture is compared with the structure obtained by connecting a plurality of CPU cells via a bus. The structure obtained by connecting a plurality of CPU cells through a bus, etc. is referred to as a loosely-coupled architecture.

Figure 11B:
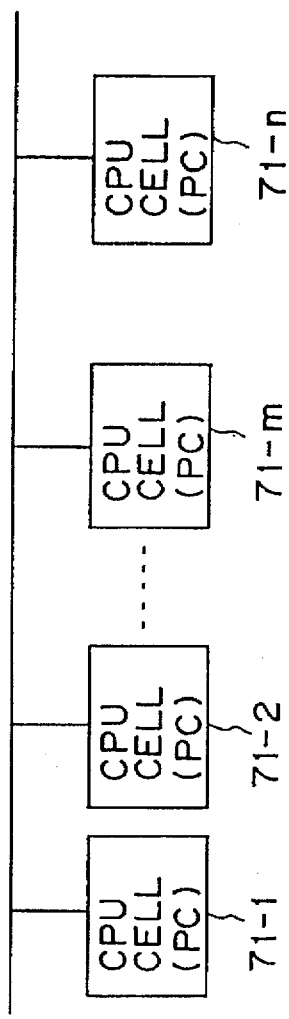
FIG. 11B shows the configuration of the inter-processor communications unit in a loosely-coupled architecture.
Figure 11A:
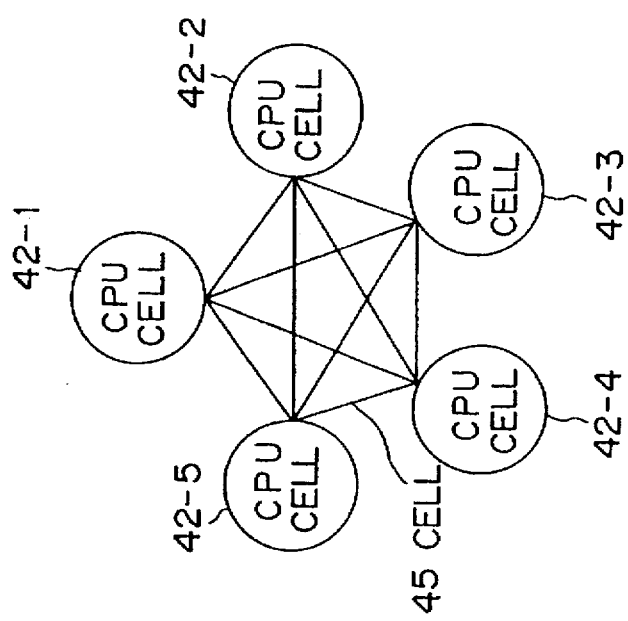
FIG. 11A shows the configuration of the inter-processor communications unit in a tightly-coupled architecture.

FIG. 11A shows the tightly-coupled architecture. In this example, five CPU cells 42-1–42-5 are connected in a mesh form through the high-speed communications network 45. FIG. 11B shows a loosely-coupled architecture. A plurality of CPU cells 71-1–71-n are connected through a bus.

In the tightly-coupled architecture, a plurality of CPU cells are connected through a broadband transmission line (high-speed communications network 45) based on the configuration of a massively parallel processor, and the communications are established in parallel between plural pairs of CPU cells. That is, the communications between the CPU cells 42-1 and 42-2 and between the CPU cells 42-3 and 42-4 are simultaneously established.

The loosely-couples architecture is similar to the configuration in which a plurality of personal computers are connected through a general-purpose communications line such as Ethernet, etc. to connect a plurality of CPU cells through a general-purpose communications line. Therefore, when a communications process occupies a bus, another communications process cannot be performed. For example, while the CPU cells 71-1 and 71-2 communicate with each other, the CPU cell 71-m or 71-n cannot establish communications.

FIG. 12 is a table showing the performance of the inter-processor communicating unit and the influences on its services. It shows the inter-processor communications latency, inter-processor communications throughput, and data communications unit for the tightly- and loosely-coupled architectures. It also shows the synchronization and retrieval of distributed multimedia data and the influence on the synchronous service to a plurality of users.

Described below by referring to three examples is the comparison between the tightly-coupled architecture and loosely-coupled architecture.

In the first example, a model requiring the synchronization among plural pieces of media data is taken up to compare a tightly-coupled architecture with a loosely-coupled architecture. Assuming that a service is provided such that sequential video images are displayed on multiple screens as shown in FIG. 10, the following conditions are given for comparison.

Sixteen CPU cells 42-1–42-16 transfer multimedia data read from the disk devices to a specific client. The client generates the sixteen pieces of multimedia data (sequential video image, voice data, graphical screen) for display on a multiwindow screen. The multimedia data transferred from each CPU cells is synchronized with each other. The synchronization is performed by transmitting a synchronization signal from the CPU cell (for example, the CPU cell 42-1) which has received an instruction from the control server 43 to other 15 CPU cells (CPU cells 42-2–42-16). The synchronization signal is a 16-byte signal transmitted every 0.5 second.

Under the conditions, a calculation is made to determine whether or not the above described information distribution service can be provided.

To synchronize and transmit the 16 pieces of multimedia data to a single client, a CPU cell transmits a 16-byte synchronization signal every 0.5 second to other 15 CPU cells. Therefore, the volume of information required for synchronization is 16×15 bytes per client every 0.5 second.

In the case of a tightly-coupled architecture, the synchronization signal is transferred through the high-speed communications network 45. Assuming that the latency of the inter-processor communications is 20μ seconds and that the throughput is 10 MBps, the transmission time of 16×15 byte-information (time required to transfer a synchronization signal from a CPU cell to other 15 CPU cells) is 330 μ seconds (300μ seconds when the latency is 91%. Thus, the number of clients to whom 16 pieces of multimedia data can be transferred by transmitting a synchronization signal without delay between CPU cells is 0.5 second/330μ seconds= 1520 (users).

Assuming that the volume of the information to be sent from each CPU cell in the inter-processor communications matches the volume of the information to be received by each CPU, one CPU involves 1520/2 =760 (users). Therefore, 16 CPU cells involve 760×16 =12160 (users).

Assuming that the latency is 1.5 msec and the throughput is 1.25 Mbps in the case of the loosely-coupled architecture, the transmission time for 16×15 bytes is 22.7 msec (22.5 msec. when the latency is 99%). Therefore, the number of users to whom 16 pieces of multimedia data can be transmitted by sending synchronization signals between the CPU cells without delay is 0.5 second/22.7 msec=22 (users), thus considerably decreasing in comparison with the case of the tightly-coupled architecture. If the loosely-coupled architecture is Ethernet, all data is transmitted via a single bus and communications cannot be established while the synchronization information is transmitted.

Described below is the second example in which multimedia data is retrieved. Each type of multimedia data is stored as being distributed to a plurality of stream servers, and the data is retrieved in a daisy-chain form according to a keyword. When data is retrieved in the daisy-chain form, a retrieval result can be obtained only if a retrieval request is issued to a processor exclusively used for a database as long as the stored contents refer to a fixed database.

However, if picture data is downloaded from a multimedia server and an order of a merchandise item appearing in the picture is received as an online shopping, and if the merchandise price and the distribution route depend on the quantity of the ordered merchandise or the trade state of other items of the merchandise, then the customer data, merchandise data, order data, distribution data, etc. are updated from time to time. In such cases, the multimedia server should be provided with a database function. That is, the function of distributing multimedia data should interlock with the database function.

Figure 13:
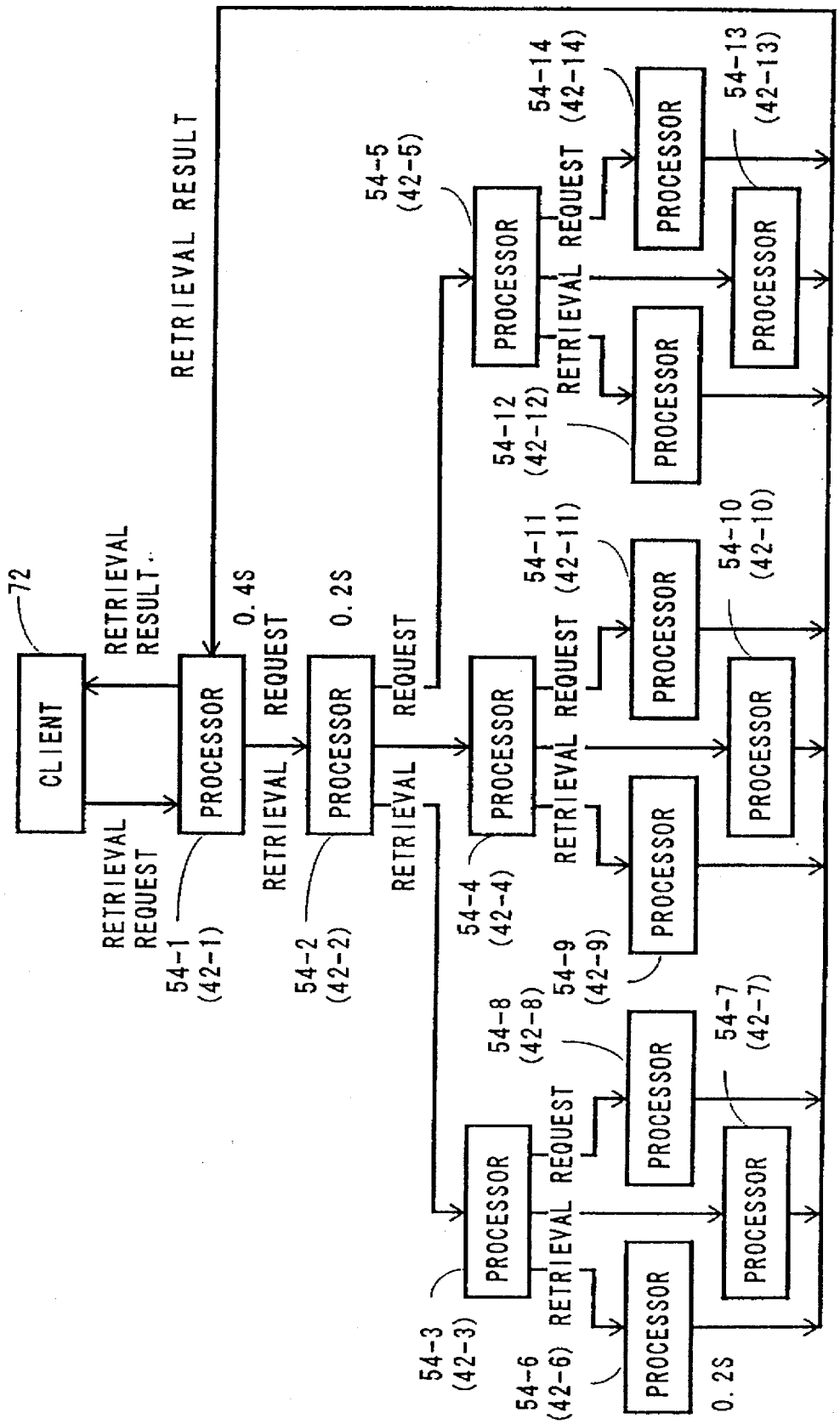
FIG. 13 shows the communications models for searching a distributed multimedia database.

FIG. 13 shows the communications model of the distribution multimedia database retrieval. Described below is the retrieval in a multimedia server in the daisy-chain form using the model shown in FIG. 13. In FIG. 13, each of the processors 54-1–54-14 is the CPU 54 in the CPU cells 42-1–42-14. In FIG. 13, the CPU cells 42-1–42-14 refers to the processors 54-1–54-14.

A client 72 is connected to, for example, the ATM network 47. If the client 72 issues a retrieval request, the retrieval request is analyzed by the control server 43.

In the process request information shown in FIG. 8, the retrieval request specifies "retrieval" as request type information, specifies "client 72" as source information and destination information, and stores as other information a keyword to be retrieved.

When the control server 43 receives the retrieval request, it requests a predetermined CPU cell to retrieve data. There are two methods of specifying the predetermined CPU cell.

The first method is to set in the control server 43 which stream controller stores the information about retrieval keywords. In this method, for example, the stream controller 41-1 stores sporting information, the stream controller 41-2 stores political information, and so forth to store data in field units. The control server 43 analyzes the field to which the keyword specified in the retrieval request received from the client 72 belongs, and issues a retrieval request to the stream controller storing the data on the keyword.

The second method is to allow the above described function to be assigned to a specific CPU cell (CPU cell 42-1 in this example). That is, the CPU cell 42-1 recognizes which stream controller stores the information on the retrieval keyword. Therefore, when the control server 43 receives a retrieval request from the client 72, it requests the CPU cell 42-1 to perform the retrieval process. Then, the CPU cell 42-1 requests a predetermined CPU cell to retrieve data.

Described below is the function of retrieving data in the above described first method which is basically the same as the second method.

If the information relating to the keyword specified by the client 72 is stored in the stream controller 41-1, then the control server 43 transfers the retrieval request to the processor 54-1 (CPU cell 42-1) through the bus 44. The instruction transferred from the control server 43 to each CPU cell comprises a command code and its parameter. A command code refers to "retrieval" here. The parameter is variable length information and an argument to a command. If a retrieval request is issued, a keyword, a logical equation, etc. are set in the parameter.

The processor 54-1 searches the disk device in the stream controller 41-1 according to the retrieval request and obtains a retrieval result. Whether or not the information relating to the retrieval result is stored in another stream controller is determined by the pointer value set in the retrieval result. In this example, the information about the retrieval result of the processor 54-1 is stored in the stream controller 41-2.

The processor 54-1 transfers the retrieval result and a retrieval request to retrieve the information relating to the retrieval result to the processor 54-2 (CPU cell 42-2). It also transfers to the processor 54-2 the information identifying the processor (processor 54-1 in FIG. 13) which has first received the retrieval request. The communications between the processor 54-1 and processor 54-2 (between the CPU cell 42-1 and CPU cell 42-2) are established through the high-speed communications network 45.

Likewise, if the information relating to the retrieval result of the processor 54-2 is stored in the stream controllers 41-3, 41-4, and 41-5, then the processor 54-2 transfers the retrieval result and a request to retrieve the information relating to the retrieval result to the processors 54-3, 54-4, and 54-5 (CPU cells 42-3, 42-4, and 42-5).

If no information relating to the retrieval exists in a retrieval process in a processor, that is, if the retrieval has been completed, then the processor transfers the retrieval result to the processor which has first received the retrieval request (processor 54-1). For example, the processor 54-6 transfers the retrieval result to the processor 54-1. The retrieval result is transferred also through the high-speed communications network 45. Then, the processor 54-1 transfers the retrieval results collected from each processor to the client 72.

Thus, if the information about the retrieval result in a processor i is stored in the stream controller managed by another processor 2, then the processor 1 transfers a retrieval result and retrieval request to the processor 2 through the high-speed communications network 45.

Assume that, in the above described retrieval, the process time of the processor 54-1 (CPU cell 42-1) is 0.4 second and that the process time of the processors 54-2–54-14 (CPU cells 42-2–42-14) is 0.2 second. Since the processor 54-1 contains the time taken for collecting a retrieval result, etc., its process time is longer than that of other processors. The information (retrieval result, retrieval request, etc.) transferred between the CPU cells is transferred in 1.5 Kbyte unit.

Under the above described conditions and shown in FIG. 13, the response time from the issue of the retrieval request from the client 72 to the output of the retrieval result is calculated as 0.4+0.2+0.2 +0.2=1.0 second with the 4-stage daisy-chain-form retrieval and with the communications time between the processors set to 0 with the 4-stage daisy-chain-form retrieval. The volume of the information per client is 1.5×103 Kbytes (103 1.5-Kbyte packets).

The time required for transferring 1.5-Kbyte packets is 170 μsec with 20 μsec latency and 10 Mbps throughput. (actual transmission time=1.5 KB/10 MB =150 μsec; and latency=20 μsec)

If a processor transfers the information of the volume for one client to another processor, it requires 170 μsec×103=18 msec. Thus, the response time is calculated as 1.0 sec+18 msec=1.02 sec for a single client.

In FIG. 13, the data can be transferred in parallel from the processor 54-3 to the processor 54-6, from the processor 54-4 to the processor 54-9, and from the processor 54-5 to the processor 54-12. That is, when a large number of clients issue retrieval requests, data is transferred in parallel by a plurality of processors connected through the high-speed communications network 45. Therefore, communications can be established in parallel by the maximum of 7 pairs of processors in a configuration containing 14 processors. Accordingly, the following calculation can be made when there are a lot of clients.

| | |
|---|---|
| for 100 clients | 1.0 sec + 18 msec × 100/7 |
| | = 1.26 sec |
| for 1000 clients | 1.0 sec + 18 msec × 1000/7 |
| | = 3.57 sec |

For a loosely-coupled architecture, the time required for transmitting 1.5 Kbytes is 2.7 msec with 1.5 msec latency and 1.25 Mbps throughput. (actual transmission time=1.5 KB/1.25 MB=1.2 msec; and latency=1.5 msec) Thus, the 1.5×103 Kbyte data is transferred in 2.7 msec×103=280 msec. Therefore, the response time can be calculated as follows.

| | |
|---|---|
| for 1 client | 1.0 sec + 280 msec |
| | = 1.28 sec |
| for 100 clients | 1.0 sec + 280 msec × 100 |
| | = 29 sec |
| for 1000 clients | 1.0 sec + 280 msec × 1000 |
| | = 281 sec |

Thus, the tightly-coupled architecture enables a higher-speed retrieval than the loosely-coupled architecture.

Next, a user-involved Game is considered as the third example. A user-involved game refers to a game in which a plurality of users take part in a game as players and an event generated by the operation of one user simultaneously has an influence on the displays of all users. For example, if a user moves a tank, the tanks displayed on the display units of all players simultaneously move the same way. The model of this game is described as follows.

(1) Variable number of players (2) Realtime sequential video image data (30 frames/sec)

(3) The drawing function can be selected from the following two configurations.

1. Configuration in which object data is held by each set-top box. The actual object drawing data for mountains, trees, buildings, tanks, etc. are stored in a set-top box. The geographical data, map data, and positions, etc. of fixed objects are downloaded from the multimedia server to the set-top box at the start point. The position of a moving object (another player, etc.) is transmitted on real time from the multimedia server. The set-top box uses the data, performs a drawing process with an accelerator, etc. of a computer graphics (CG), and displays a resultant image.

2. Configuration in which the drawing function is provided by the server

Considering the position of a moving object and the effective range of the radar, etc., the CG screen is generated by the server and is provided for a set-top box. The set-top box displays the data received from the multimedia server.

The alternative of 1 or 2 above depends on the capabilities of the set-top box and the capabilities of the CPU cell in the multimedia server. A common communications game relates to 1 above. In this case, a negotiation is made about the performance, etc. of the accelerator of the set-top box, and then the initial data is downloaded to the set-top box after determining the quality and quantity of the information to be downloaded.

(4) Contents of Communications (from each player to server)

position data
  of moving object (X, Y, Z): 3×32 bits direction data
  of moving object (θ, φ, γ) :3×16 bits number of action items (m) : m×64 bits An action item refers to the information indicating, for example, discharging a missile. If the number of action items m is 10, the data of 96+48+10×64=784 bits (98 bytes) is generated by one player every 1/30 second and transferred to the server. In the calculation described later, it is adjusted into 100 bytes for simplicity.

The number of players accommodated in each processor (CPU cell in FIG. 5 or FIG. 11A, and personal computer in FIG. 11B) is n. Therefore, if the number of players in this game is equal to or larger than n, a plurality of processors synchronously operate in the inter-processor communications. The changes generated by a player in the inter-processor communications on the display are transmitted to all the other players. The changes (position data, direction data, and action items) generated by each player are transferred to the server every 1/30 second.

In the tightly-coupled architecture, the required communications time can be represented by the following equation according to the document "Optimum All-to-All Communications System in Torus Network" by Horie and Hayashi in the literature of the Information Processing Academy vol.,134, no.4, pp.628–637; Apr. 1993).

$$T=(P-\tfrac{3}{4})*(11.6+m/17.1) \ \mu sec$$

where P indicates the root of the number of processors, and m indicates the message size (number of bytes).

FIG. 14 is a table indicating the number of players simultaneously participating the game in the tightly-coupled architecture. FIG. 14 also shows the size of a message communicable in 33.3 msec (1/30 sec) to display sequential video image data.

In the loosely-coupled architecture in which n personal computers are connected, communications should be established n×(n−1) times for each personal computer to communicate with all the other personal computers. That is, if there are two personal computers, communications should be established 2 times. If there are three personal computers, communications should be established 6 times. If there are four personal computers, communications should be established 12 times. If there are five, communications should be established 20 times. In the loosely-coupled architecture, communications cannot be established in parallel.

Assuming that the loosely-coupled architecture is Ethernet, the packet size is 1518 bytes, and that the transfer rate of 10 Mbps can fully work, the maximum number of packets can be calculated as follows.

10 Mbps/1518 bytes=863 packets/sec

This indicates 28 packets every 1/30 second.

The number of packets is calculated simply based on the physical transfer capabilities of Ethernet. Practically, the number of packets is smaller than the above mentioned value because the carrier sensing time is required, a process should be performed if a collision takes place, and the header process and Ack process, etc. are additionally required.

The user data size in a packet is 1460 bytes at maximum. Therefore, 100-byte information is transferred for one player every 1/30 sec, and the information for a total of 14 players can be transferred in one packet as calculated by the following equation.

1460 (bytes/packet) / 100 (bytes/player)=14 players/packet

FIG. 15 is a table showing the number of players simultaneously participating the game in the loosely-coupled architecture. It is calculated that the information of 14 players can be transferred in one packet. In comparison with the tightly-coupled architecture, the number of simultaneously-participating players is considerably small.

As described above, the multimedia server according to the present invention separates the path through which a process request from the user is provided for the processor unit from the transmission line of the multimedia data. The multimedia server stores multimedia data in the input/output unit for outputting and receiving data through the network, thereby efficiently transmitting a large volume of multimedia data at a high speed.

When a plurality of processors control the transmission of multimedia data, a network is provided to interconnect the plurality of processors and transmit information through the network. Thus, in a large-capacity multimedia server for storing various data in a plurality of storage devices, the data read from the plurality of storage devices can be synchronously transferred at a high speed.

What is claimed is:

1. A multimedia server for processing data according to a process request transferred through a network, comprising:
    a plurality of stream controllers directly connected to the network, wherein each of said stream controllers including storing means for storing data;
    a plurality of processing means, each being coupled to a corresponding one of said data storing means, for performing and controlling data transmission between each of said stream controllers and the network; and
    control means, connected to said plurality of processing means via a communications line provided other than the network, and also connected to the network for receiving the process request through the network, and controlling said plurality of processing means according to the process request.

2. The multimedia saver according to claim 1, further comprising:
    switch for connecting said plurality of stream controllers to the network.

3. The multimedia server according to claim 2, wherein when one of said plurality of processing means instructs the corresponding one of said plurality of steam controllers to transmit data stored in the corresponding one of said plurality of stream controllers to at least another one of said plurality of stream controllers, data is transmitted from the corresponding one of said plurality of stream controllers to the at least another of said plurality of stream controllers via said switch.

4. The multimedia server according to claim 1 further comprising:
    an inter-processing-means for interconnecting said plurality of processing means by transmitting at least a request, an instruction and a synchronization signal from one of said plurality of processing means to at least another one of said plurality of processing means.

5. The multimedia server according to claim 4, wherein said inter-processing-means network is formed as a torus network.

6. The multimedia server according to claim 4, wherein said plurality of processing means transmit a signal required to synchronize data through said inter-processing-means network when the data read from said plurality of stream controllers are synchronously transferred to the network.

7. The multimedia server according to claim 4, wherein said plurality of processing means transmit a signal required to synchronize data through said inter-processing-means network when information transferred from a user connected to the network is synchronously transferred to a plurality of users.

8. The multimedia server according to claim 4, wherein a retrieval request is transferred from a first processing means to a second processing means through the inter-processing-means network when a retrieval result of the first processing means is associated with data stored in said stream controllers controlled by the second processing means in retrieving the data stored in said plurality of stream controllers.

9. The multimedia server according to claim 1, wherein said process request is provided from said control means to said plurality of processing means through said communications line.

10. The multimedia server according to claim 1, wherein said control means stores information indicating which stream controller stores each piece of data, and, when receiving the process request to process a specific data, notifies said processing means which controls said stream controller having the specific data.

11. The multimedia server according to claim 1, wherein a pair of said stream controllers and said processing means are added or deleted when a system configuration of said multimedia server is modified.

12. The multimedia server for outputting data through a network, comprising:

- a plurality of stream controllers directly connected to the network, wherein each of said stream controllers including storing means for storing data;
- a plurality of processing means, each being coupled to a corresponding one of said data storing means, for performing and controlling data transmission from each stream controller through the network; and
- an inter-processing-means for interconnecting said plurality of processing means by transmitting at least a request, an instruction and a synchronization signal from one of said plurality of processing means to at least another one of said plurality of processing means.

13. The multimedia server according to claim 12, wherein said plurality of processing means transmit a signal required to synchronize data through said inter-processing-means network when the data read from said plurality of stream controllers are synchronously transferred to the network.

14. A multimedia server for distributing video data according to a distributing request transferred through a network, comprising:

- a plurality of stream controllers directly connected to the network, wherein each of said stream controllers including storing means for storing video data;
- a plurality of processing means, each being linked to corresponding one of said plurality of stream controllers, for controlling data output from said plurality of stream controllers to the network; and
- control means, connected to said plurality of processing means via a communication line provided other than the network and also connected to the network for receiving the distributing request through the network, issuing an instruction for data output according to the distributing request and transmitting the instruction to at least one of said plurality of processing means via the communication line,
- wherein the at least one of said plurality of processing means which receives the instruction from said control means controls data output from said corresponding stream controller according to the instruction.

* * * * *